United States Patent
Ikeda (10) Patent No.: US 10,230,897 B2
(45) Date of Patent: Mar. 12, 2019

(54) CONTROL APPARATUS, IMAGE CAPTURING APPARATUS, LENS APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Shunichiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/685,267

(22) Filed: Aug. 24, 2017

(65) Prior Publication Data
US 2018/0063437 A1    Mar. 1, 2018

(30) Foreign Application Priority Data
Aug. 31, 2016 (JP) ................. 2016-168721

(51) Int. Cl.
*G03B 5/00* (2006.01)
*H04N 5/232* (2006.01)
*G02B 27/64* (2006.01)

(52) U.S. Cl.
CPC ..... *H04N 5/23258* (2013.01); *H04N 5/23254* (2013.01); *H04N 5/23261* (2013.01); *H04N 5/23267* (2013.01); *H04N 5/23287* (2013.01); *G02B 27/646* (2013.01); *G03B 5/00* (2013.01); *G03B 2205/0007* (2013.01); *H04N 5/23248* (2013.01)

(58) Field of Classification Search
CPC ................................. G03B 5/00

USPC ................................. 396/55
See application file for complete search history.

(56) References Cited

U.S. PATENT DOCUMENTS

| | | | |
|---|---|---|---|
| 5,835,641 A * | 11/1998 | Sotoda | H04N 5/23248 382/291 |
| 9,883,105 B2 * | 1/2018 | Haruna | H04N 5/23254 |
| 2008/0094498 A1 * | 4/2008 | Mori | G03B 5/02 348/352 |
| 2016/0028958 A1 * | 1/2016 | Tsuchiya | G03B 5/00 348/208.4 |

(Continued)

FOREIGN PATENT DOCUMENTS

| JP | 2006-317848 A | 11/2006 | |
|---|---|---|---|
| JP | 2006317848 | * 11/2006 | ............... G03B 5/00 |

OTHER PUBLICATIONS

Jeff Curto, 'Basic Photography', www.jeffcurto.com, 2014, pp. 18, 20-21, 68.*

(Continued)

*Primary Examiner* — Clayton E Laballe
*Assistant Examiner* — Kevin Butler
(74) *Attorney, Agent, or Firm* — Venable LLP (57) ABSTRACT

A control apparatus includes a motion vector detector (118) that detects a motion vector, a calculator (126) that calculates angular velocity information of an object based on the motion vector and an angular velocity detected by an angular velocity detector, and a controller (122) that controls a shake corrector based on the angular velocity information of the object, and the controller changes control of the shake corrector depending on information relating to correction of an output signal from the angular velocity detector.

17 Claims, 6 Drawing Sheets

(56) References Cited

U.S. PATENT DOCUMENTS

| | | | | |
|---|---|---|---|---|
| 2016/0165139 A1* | 6/2016 | Takayanagi | ........ | H04N 5/23261 |
| | | | | 348/208.4 |
| 2016/0261784 A1* | 9/2016 | Mukunashi | .......... | H04N 5/2353 |
| 2016/0301871 A1* | 10/2016 | Kuchiki | ............. | H04N 5/23261 |
| 2017/0026580 A1* | 1/2017 | Gyotoku | ............. | H04N 5/23254 |
| 2017/0041546 A1* | 2/2017 | Haruna | ............. | H04N 5/23267 |
| 2017/0163997 A1* | 6/2017 | Haruna | ................ | H04N 19/167 |
| 2017/0257573 A1* | 9/2017 | Abe | ................... | H04N 5/23267 |
| 2017/0318224 A1* | 11/2017 | Kuchiki | ............. | H04N 5/23287 |
| 2018/0063437 A1* | 3/2018 | Ikeda | ................. | H04N 5/23258 |
| 2018/0063439 A1* | 3/2018 | Miyazawa | ......... | H04N 5/23287 |

OTHER PUBLICATIONS

Shapiro and Stockman, 'Chapter 9 Motion from 2D Image Sequences', Computer Vision, Mar. 2000, pp. 1-30.*

* cited by examiner

CONTROL APPARATUS, IMAGE CAPTURING APPARATUS, LENS APPARATUS, CONTROL METHOD, AND NON-TRANSITORY COMPUTER-READABLE STORAGE MEDIUM

BACKGROUND OF THE INVENTION

Field of the Invention

The present invention relates to control in panning photographing.

Description of the Related Art

As one of photographing methods of cameras, there is panning photographing. This is a technique for photographing while keeping the camera follow the motion of an object moving in a horizontal direction, for example, by setting a shutter speed to be a long second to obtain a feeling of lively motion of the object. Commonly, the panning photographing is a difficult photographing technique for beginners. There are mainly two reasons, that is, it is difficult to shoot objects well while shaking the camera, and it is difficult to set the shutter speed to obtain the feeling of lively motion of the object. As the shutter speed is slowed down, a flow amount of the background increases and the feeling of lively motion comes out, but a hand-shake (i.e., camera shake) and an object shake are likely to occur.

Japanese Patent Laid-Open No. 2006-317848 discloses a method of detecting a difference between the speed of the object and the speed of shaking the camera and correcting an amount of deviation corresponding to the difference by using a hand-shake correcting function. Immediately before photographing, the angular velocity with respect to the panning (or tilting) of the camera following the object is detected by the angular velocity sensor in the camera. At the same time, an amount of movement of a main object image on an imaging plane is detected. An angular velocity of the object is calculated based on the detected panning velocity and the amount of movement of the object image on the imaging plane. During exposure, an image blur correcting operation is performed according to a difference between the calculated angular velocity of the main object and an output of the angular velocity sensor in the camera. As a result, the difference between the velocity of the main object and the panning velocity of the camera (object shake amount) and the hand-shake amount are corrected, and accordingly it is possible to suppress an image blur of the main object as a target of the panning photographing.

In order to perform control in the panning photographing disclosed in Japanese Patent Laid-open No. 2006-317848, it is necessary to detect the angular velocity of the object by using a motion vector. Since the motion vector includes an object vector and a background vector, it is necessary to separate these vectors from each other. In order to separate these vectors from each other, the output of the angular velocity sensor is used. However, since the angular velocity sensor includes a low frequency noise due to a unique offset noise and temperature fluctuation, it is difficult to separate the object vector and the background vector as the noise becomes larger, which affects the accuracy of control in the panning photographing.

In Japanese Patent Laid-open No. 2006-317848, an offset noise of the angular velocity sensor is not taken into consideration, and there may be a case where control in the panning photographing is performed based on information including many noise components.

SUMMARY OF THE INVENTION

The present invention provides a control apparatus, an image capturing apparatus, a lens apparatus, a control method, and a non-transitory computer-readable storage medium which can perform control in panning with high accuracy.

A control apparatus as one aspect of the present invention includes a motion vector detector configured to detect a motion vector, a calculator configured to calculate angular velocity information of an object based on the motion vector and an angular velocity detected by an angular velocity detector, and a controller configured to control a shake corrector based on the angular velocity information of the object, and the controller is configured to change control of the shake corrector depending on information relating to correction of an output signal from the angular velocity detector.

A control apparatus as another aspect of the present invention includes an angular velocity detector configured to detect an angular velocity, and a shake corrector configured to correct a shake by using angular velocity information of an object calculated based on the angular velocity and a motion vector detected by a motion vector detector, and the shake corrector is configured to correct an output signal from the angular velocity detector and send information relating to correction of the output signal.

An image capturing apparatus as another aspect of the present invention is an image capturing apparatus to which a lens apparatus is detachably attached, includes an image sensor configured to photoelectrically convert an optical image formed via the lens apparatus, a motion vector detector configured to detect a motion vector based on an image signal output from the image sensor, a calculator configured to calculate angular velocity information of an object based on the motion vector and an angular velocity detected by an angular velocity detector, and a controller configured to control a shake corrector based on the angular velocity information of the object, and the controller is configured to change control of the shake corrector depending on information relating to correction of an output signal from the angular velocity detector.

A lens apparatus as another aspect of the present invention is a lens apparatus detachably attached to an image capturing apparatus, includes an image capturing optical system including a correction lens, an angular velocity detector configured to detect an angular velocity of the lens apparatus, and a shake corrector configured to correct a shake by using angular velocity information of an object calculated based on the angular velocity and a motion vector detected by a motion vector detector, and the shake corrector is configured to send an output signal from the angular velocity detector and send information relating to correction of the output signal.

A control method as another aspect of the present invention includes detecting a motion vector, calculating angular velocity information of an object based on the motion vector and an angular velocity detected by an angular velocity detector, and controlling a shake corrector based on the angular velocity information of the object, and controlling the shake corrector includes changing control of the shake corrector depending on information relating to correction of an output signal from the angular velocity detector.

A control method as another aspect of the present invention includes detecting an angular velocity based on an output signal from an angular velocity detector, and correcting a shake by using angular velocity information of an object calculated based on the angular velocity and a motion vector detected by a motion vector detector, and correcting the shake includes correcting the output signal from the angular velocity detector and sending information relating to correction of the output signal.

A non-transitory computer-readable storage medium storing a program which causes a computer to execute the control method.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Figure 1:
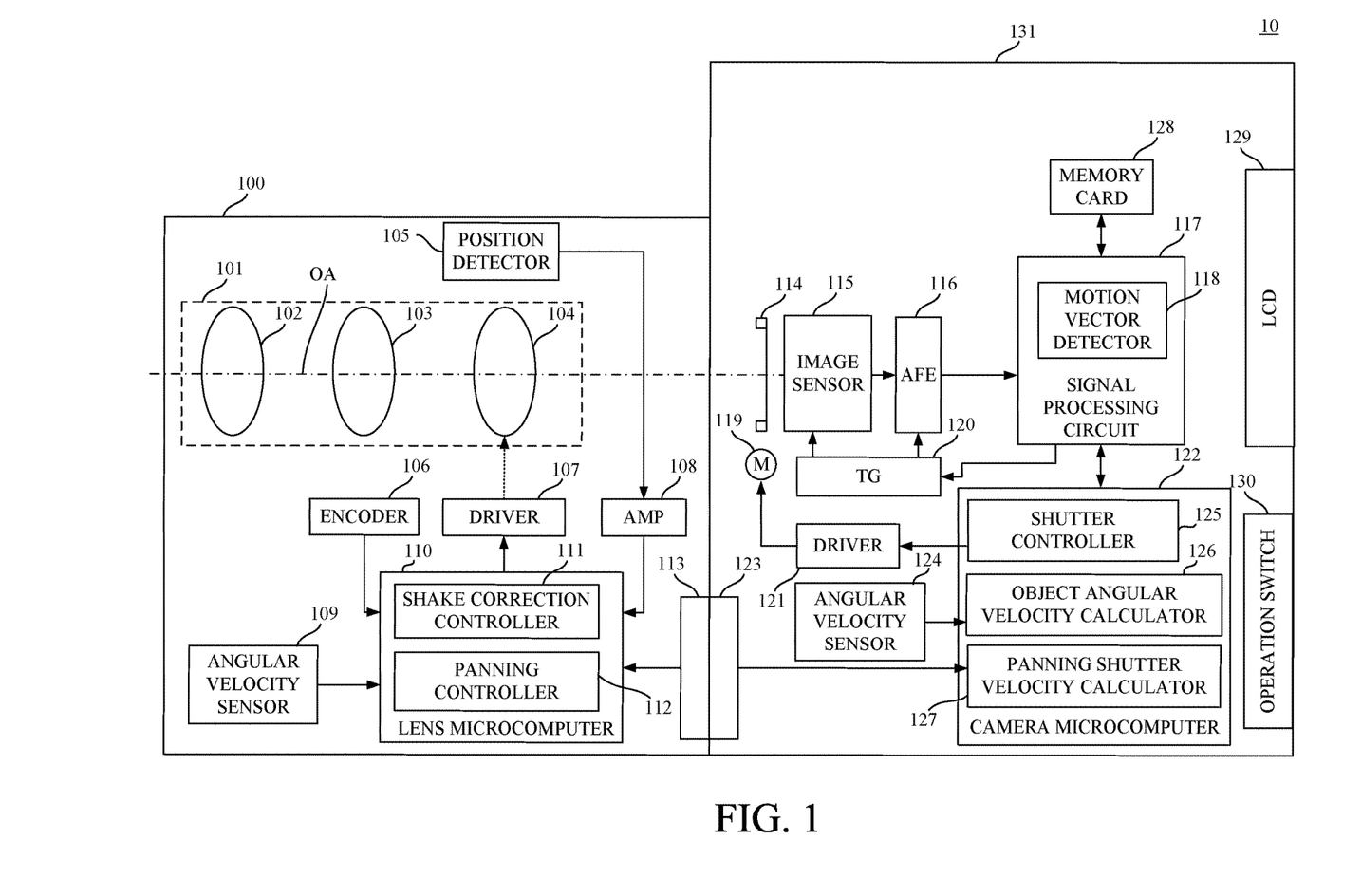
FIG. 1 is a block diagram of an image capturing system in this embodiment.

First, referring to FIG. 1, an image capturing system in this embodiment will be described. FIG. 1 is a block diagram of an image capturing system 10. The image capturing system 10 includes a camera body (image capturing apparatus body) 131 and an interchangeable lens (lens apparatus) 100 detachably attached to the camera body 131. However, this embodiment is not limited thereto, and can also be applied to an image capturing apparatus where the image capturing apparatus body and the lens apparatus are integrally configured.

The interchangeable lens 100 has a lens unit (image capturing optical system) 101. The lens unit 101 includes a main image capturing optical system 102, a zoom lens 103 capable of changing a focal length, and a shift lens 104 that moves in a direction perpendicular to an optical axis OA to optically correct an image blur with respect to the optical axis OA caused by a shake of the image capturing system 10. The interchangeable lens 100 includes a zoom encoder 106 that detects a position of the zoom lens (zoom lens unit) 103 and a position detector (position sensor) 105 that detects a position of the shift lens (shift lens unit or correction lens) 104. Further, the interchangeable lens 100 includes an angular velocity sensor (angular velocity detector) 109 such as a gyro sensor that detects the shake (angular velocity) of the image capturing system 10 (interchangeable lens 100), and a lens microcomputer 110 that controls each part of the interchangeable lens 100. In this embodiment, the lens microcomputer 110 serves as a shake corrector that corrects the shake by using angular velocity information of an object calculated based on an angular velocity detected by the angular velocity sensor 109 and a motion vector detected by a motion vector detector 118 described below. In addition, the interchangeable lens 100 includes a driver 107 that drives the shift lens 104 and an amplifier circuit (AMP) 108 that amplifies an output signal from the position detector 105 of the shift lens 104. Further, the interchangeable lens 100 has a mount contact 113 with the camera body 131.

The lens microcomputer 110 includes a shake correction controller 111 that performs shake correction control (hand-shake correction control), and a panning controller 112 that performs panning control. In addition, the lens microcomputer 110 performs focus lens control, aperture stop control, and the like, but descriptions thereof will be omitted. The lens microcomputer 110 performs control such as detection and correction with respect to two axes orthogonal to each other, such as a vertical direction and a lateral direction, in the shake correction control, but the control on these two axes is basically the same, and therefore only the control related to one axis will be described. As described above, the image capturing system 10 of this embodiment includes an image blur correction device that drives an optical element (shift lens 104) in the direction orthogonal to the optical axis OA to perform image blur correction.

The camera body 131 includes a shutter 114, an image sensor 115 such as a CMOS sensor, an analog signal processing circuit (AFE) 116, and a signal processing circuit 117. Further, the camera body 131 has a timing generator (TG) 120 that sets operation timings of the image sensor 115 and the analog signal processing circuit 116, and an operation switch 130 including a power switch, a release switch, and the like. In addition, the camera body 131 has a camera microcomputer (controller) 122 that controls the entire camera system. In this embodiment, the camera microcomputer 122 controls the lens microcomputer (shake corrector) 110 based on the angular velocity information of the object.

The camera body 131 has a motor 119 that drives the shutter 114 and a driver 121 that drives the motor 119 for performing a shutter operation. The camera body 131 also includes a memory card 128 that records captured images, a liquid crystal panel (LCD) 129 that monitors an image being captured by the camera body 131 and that displays the captured images, and a mount contact 123 with the interchangeable lens 100. Further, the camera body 131 has an angular velocity sensor 124. The lens microcomputer 110 and the camera microcomputer 122 perform serial communication at a predetermined timing via the mount contacts 113 and 123.

The image sensor 115 includes a CMOS sensor or the like and it photoelectrically converts an object image (optical image) formed via the interchangeable lens (image capturing optical system) 100. The signal processing circuit 117 includes a motion vector detector 118 that detects a motion (motion vector) of an object based on an output signal (image signal) from the image sensor 115. The camera microcomputer 122 has a shutter controller 125, an object angular velocity calculator (calculator) 126, and a panning shutter speed calculator 127. The object angular velocity calculator 126 calculates the angular velocity of the main object (angular velocity information of the object) based on the motion vector detected by the motion vector detector 118 and the angular velocity detected by the angular velocity sensor 109 (angular velocity detector).

When the power of the camera body 131 is turned on by the operation switch 130, the camera microcomputer 122 detects the state change (power ON) and supplies power to each circuit of the camera body 131 and performs initial setting. At this time, the power is supplied to the interchangeable lens 100, and the lens microcomputer 110 performs initial setting of the interchangeable lens 100. Then, the lens microcomputer 110 and the camera microcomputer 122 start communication at a predetermined timing. By this communication, the state of the camera body 131, image capturing setting information, and the like are sent from the camera body 131 to the interchangeable lens 100 at a predetermined timing. Further, from the interchangeable lens 100 to the camera body 131, focal length information and angular velocity information of the interchangeable lens 100, and the like are sent at a predetermined timing.

When a panning mode is not selected, the angular velocity sensor 109 of the interchangeable lens 100 detects a shake applied to the image capturing system (interchangeable lens 100) caused by the hand shake or the like. Then, the shake correction controller 111 performs shake correction (handshake correction) based on the shake detected by the angular velocity sensor 109.

Figure 2:
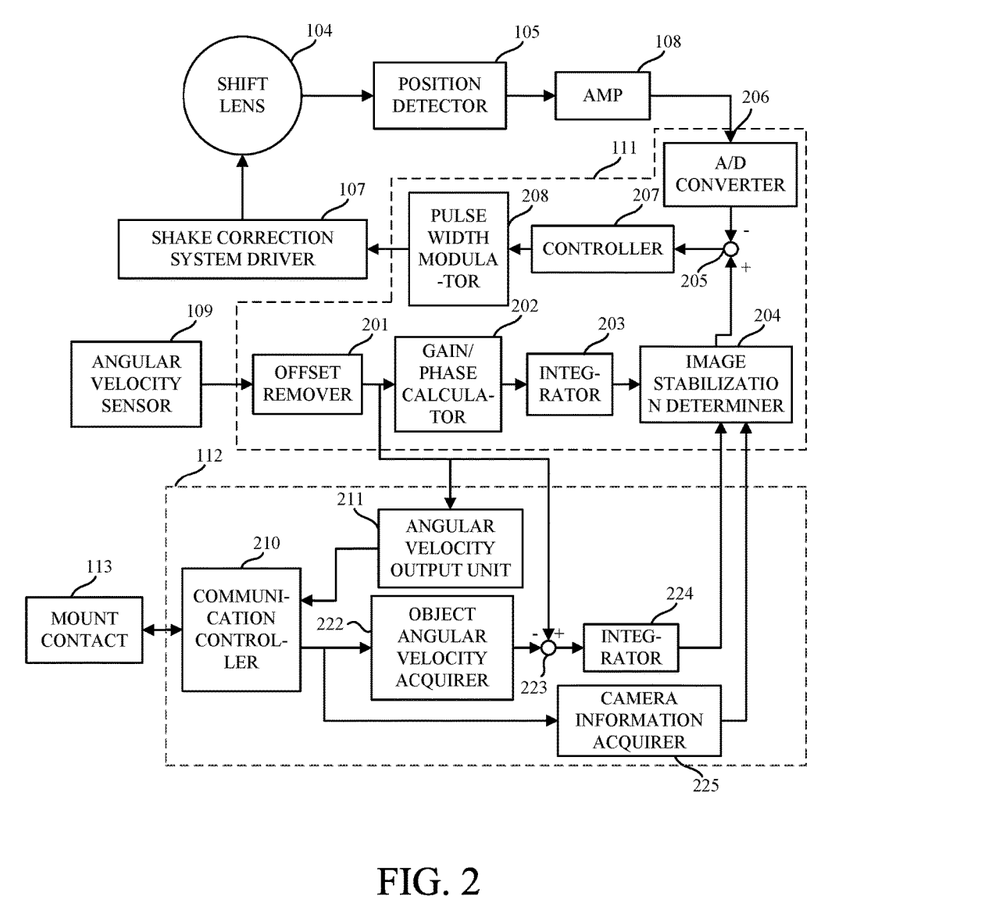
FIG. 2 is a block diagram of a shake correction system in this embodiment.

Next, referring to FIG. 2, the hand-shake correction will be described. FIG. 2 is a block diagram of a shake correction system (optical shake correction system) that performs the hand-shake correction (i.e., camera shake correction). In FIG. 2, the same reference numerals are given to the components common to FIG. 1, and descriptions thereof are omitted.

As illustrated in FIG. 2, the shake correction controller 111 includes an offset remover 201, a gain/phase calculator 202, an integrator 203, an image stabilization determiner 204, a subtractor 205, an A/D converter 206, a controller 207, and a pulse width modulator 208. The panning controller 112 includes a communication controller 210, an angular velocity output unit 211, an object angular velocity acquirer 222, a subtractor 223, an integrator 224, and a camera information acquirer 225.

The offset remover 201 is for example a filter operation unit including a high-pass filter (HPF), and it removes or reduces a DC component (direct-current component) included in an output signal from the angular velocity sensor 109. The gain/phase calculator 202 includes an amplifier that amplifies the angular velocity data whose DC component has been removed (reduced) by the offset remover 201 with a predetermined gain, and a phase compensation filter. The integrator 203 has a function capable of changing its characteristic in an arbitrary frequency band, and it integrates the output signal from the gain/phase calculator 202 to calculate a drive amount of the shift lens 104.

The image stabilization determiner 204 switches the control signal for driving the shift lens 104 according to the output signal from the camera information acquirer 225. When the panning mode is set, the image stabilization determiner 204 adopts the signal calculated by the panning controller 112, that is, the output signal of the integrator 224. On the other hand, when a mode other than the panning mode is set, the image stabilization determiner 204 adopts the signal calculated by the shake correction controller 111, that is, the output signal of the integrator 203.

The A/D converter 206 converts the signal (analog signal) obtained by amplifying the output signal of the position detector 105 detecting the position of the shift lens 104 with the AMP 108 into a digital signal. The subtractor 205 subtracts the output signal (digital signal) of the A/D converter 206 from the output signal of the image stabilization determiner 204 to be output the controller 207. The controller 207 includes an amplifier that amplifies the input signal with a predetermined gain and a phase compensation filter. The controller 207 performs signal processing by the amplifier and the phase compensation filter on deviation data that is the output signal of the subtractor 205, and it outputs the processed signal to the pulse width modulator 208. The pulse width modulator 208 modulates (the waveform of) the output signal of the controller 207 into a waveform (PWM waveform) that changes a duty ratio of the pulse wave to be output to the driver 107. The driver 107 is a voice coil type motor for driving the shift lens 104. The shift lens 104 is driven in a direction orthogonal to the optical axis OA according to the output signal of the pulse width modulator 208.

When the panning mode is set by the operation switch 130, the camera microcomputer 122 switches to panning control. In addition, the information (information indicating that the panning mode is set) is sent from the camera microcomputer 122 to the lens microcomputer 110, and the lens microcomputer 110 shifts to the panning control. The camera information acquirer 225 acquires setting information of the panning mode and release information. The angular velocity output unit 211 outputs an output signal (angular velocity data) of the angular velocity sensor 109 in the interchangeable lens 100 to the camera microcomputer 122. The object angular velocity acquirer 222 acquires angular velocity data of the main object calculated by the object angular velocity calculator 126 of the camera microcomputer 122 via the mount contact 113 and the communication controller 210. The subtractor 223 calculates a difference between the angular velocity detected by the angular velocity sensor 109 of the interchangeable lens 100 (i.e., angular velocity data from the angular velocity sensor 109) and the main object angular velocity detected by the camera body 131 (i.e., angular velocity data of the main object). The integrator 224 integrates the output signal of the subtractor 223, that is, the difference (deviation) between the angular velocity data from the angular velocity sensor 109 and the angular velocity data of the main object.

Next, a method of calculating the angular velocity (angular velocity data) of the main object will be described. When the camera body 131 is set to the panning mode, the motion vector detector 118 of the signal processing circuit 117 detects the motion vector of the object based on the captured image information (captured image), and it outputs the detected motion vector to the camera microcomputer 122. The camera microcomputer 122 receives the angular velocity data detected by the angular velocity sensor 109 of the interchangeable lens 100 from the lens microcomputer 110.

In the panning photographing, the motion vectors detected by the motion vector detector 118 include two types of vectors of (1) a motion vector of an object to be photographed by the photographer (object vector) and (2) a motion vector of the flowing background (background vector). In this case, for the purpose of panning, the object vector is adopted from the two types of the detected vectors.

Figure 3:
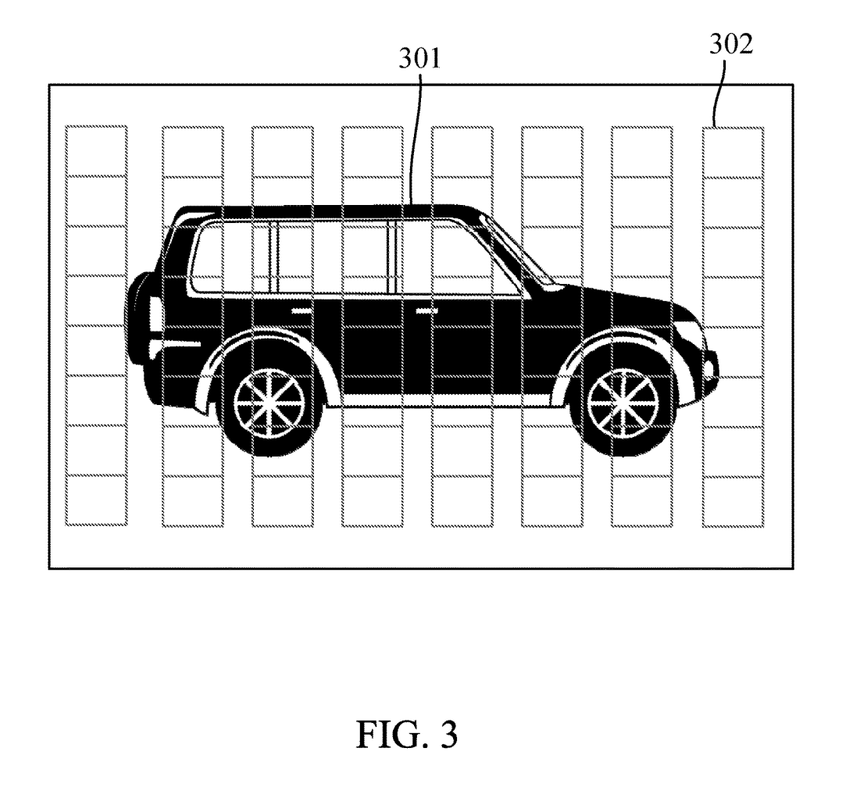
FIG. 3 is an explanatory diagram of vector detection in this embodiment.

Next, referring to FIG. 3 and FIGS. 4A and 4B, a method of adopting the object vector will be described. FIG. 3 is an explanatory diagram of vector detection in this embodiment, and it illustrates a photographing scene during panning. In motion vector detection blocks 302 (for example, arranged in 8 rows×8 columns) arranged in the screen, an amount of motion with respect to an image one frame before is detected, and the vector of an object 301 (object vector) and the background vector are detected.

Figure 4A:
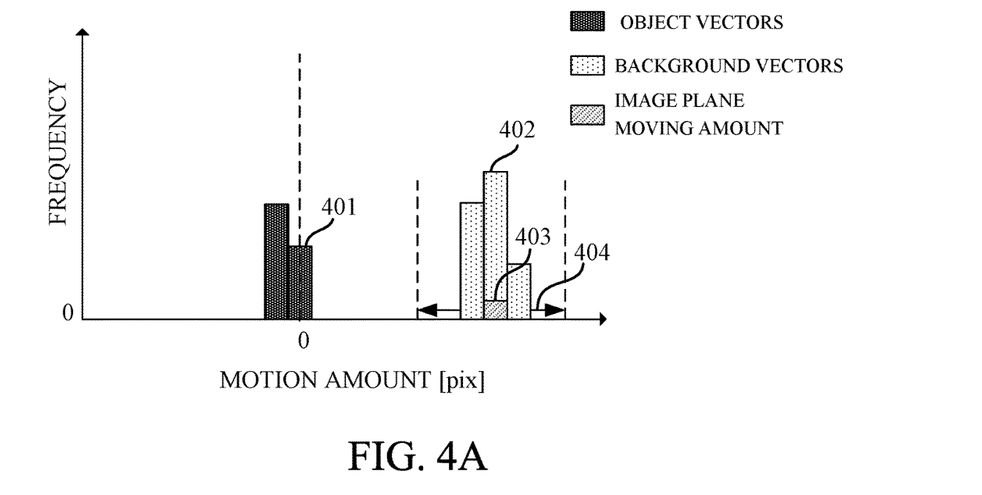
FIGS. 4A and 4B are explanatory diagrams of detection of an object vector in this embodiment.

FIG. 4A is an explanatory diagram of object vector detection, and it illustrates vectors detected by the motion vector detector 118 as a histogram. In this embodiment, angular velocity data, which are an output signal of the angular velocity sensor 109, are used in order to accurately separate the object vectors from the background vectors. When the photographer can appropriately follow the object, the object vectors exist near 0 pix. On the other hand, when the photographer is unfamiliar with photographing, the amount of motion of the object increases and the object vectors move away from 0 pix. As a result, the object vectors cannot be distinguished from the background vectors.

Therefore, in this embodiment, the camera microcomputer 122 converts the angular velocity data, which is the output signal of the angular velocity sensor 109, into an image plane moving amount 403 by using the focal length and frame rate data. Then, the camera microcomputer 122 determines that vectors existing within a certain range 404 (within a background range) with reference to the image plane moving amount 403 as background vectors 402, and vectors existing outside the certain range 404 as object vectors 401. When there are a plurality of objects in the screen, a plurality of object vectors (object vector groups) exist. In this case, an object vector group closest to a focus frame of the image capturing system 10 (camera body 131) is adopted. The reason is that there is high possibility that the photographer matches the focus frame to the object to be photographed regardless of the panning photographing. The object vectors determined in this way are the moving amount on the image plane of the main object. The output signal of the angular velocity sensor 124 of the camera body 131 may be used as the angular velocity data used for the histogram.

Figure 4B:
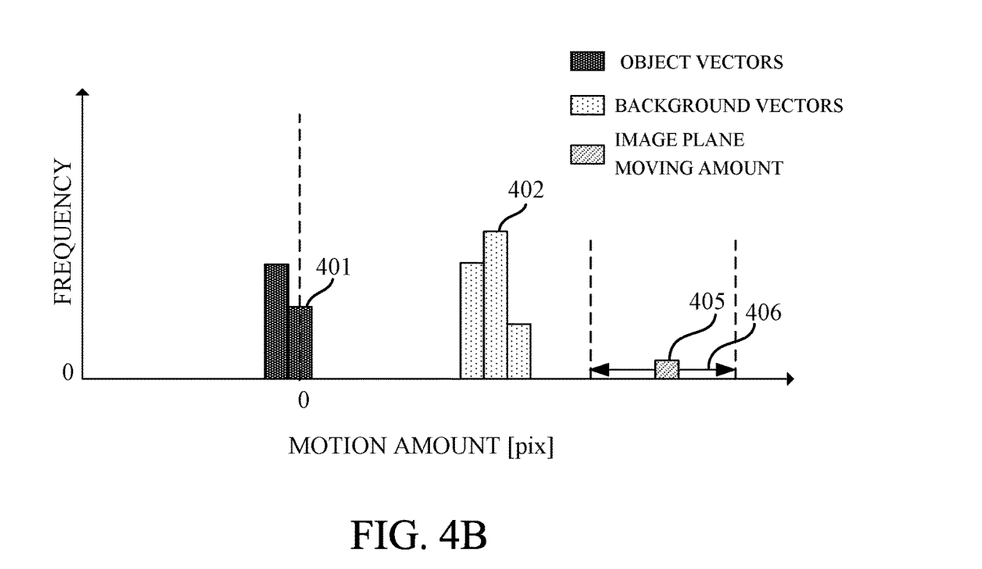

FIG. 4B is an explanatory diagram of the object vector detection when an offset noise is included in the output signal of the angular velocity sensor 109. The output signal of the angular velocity sensor 109 includes an intrinsic offset noise, a low frequency noise caused by temperature variation, and the like. When converting the output signal of the angular velocity sensor 109 including such noises into an image plane moving amount 405, the camera microcomputer 122 determines that the vectors existing outside the certain range 406 (background range) with reference to the converted image plane moving amount 405 as the object vectors. However, in this case, since both the object vectors 401 and the background vectors 402 are outside the certain range 406, the background vectors and the object vectors cannot be separated from each other. The greater the noise included in the output signal of the angular velocity sensor 109 is, the more difficult it is to separate the background vectors from the object vectors, which also affects the accuracy of control during the panning photographing.

On the other hand, the angular velocity data received from the angular velocity sensor 109 of the interchangeable lens 100 corresponds to the panning speed of the camera body 131 (image capturing system 10). Therefore, when calculating the difference between the received angular velocity data and the angular velocity calculated based on the moving amount on the image plane of the main object (imaging plane moving amount) and the current focal length of the interchangeable lens 100, the result corresponds to the angular velocity data of the main object with respect to the image capturing system 10. Then, the camera microcomputer 122 sends the calculated angular velocity data of the main object to the lens microcomputer 110.

Next, calculation of the shutter speed for the panning will be described. When the panning mode is set, the panning shutter speed calculator 127 of the camera microcomputer 122 calculates the shutter speed for the panning. In this embodiment, the shutter speed TV is represented by expression (1) below.

$$TV = \alpha / f / (\omega g - \omega s) \quad (1)$$

In expression (1), symbol a is a flowing effect (flowing amount) of the background, and it is set by the photographer via the operation switch 130. Symbol f is a focal length (focal length data) of the interchangeable lens 100, and it is acquired by communication via the mount contact 123. Symbol ωg is a camera angular velocity, and it corresponds to the output signal of the angular velocity sensor 124 of the camera body 131. Symbol ωs is a main object angular velocity, and it corresponds to the output signal of the object angular velocity calculator 126.

The flowing effect α of the background is a preset value so that the amount of movement of the background portion on the image plane is for example 800 μm. As the flowing effect α of the background, a plurality of effects, such as small, medium, and large, can be set. As described above, in the panning mode, the shutter speed is automatically set in the camera body 131 so that the flowing amount of the background is constant independently of the panning speed by the photographer, and the shutter speed can be set easily even by a photographer who is unfamiliar with the panning photographing. In this embodiment, the angular velocity data used for calculating the shutter speed for the panning is the angular velocity data acquired from the angular velocity sensor 124 provided in the camera body 131. This is because the possibility that the interchangeable lens which is not compatible with the panning mode, for example a lens which is not equipped with the shift lens 104 for optical shake correction is mounted on the camera body 131 is taken into consideration. That is, in such a case, the output signal of the angular velocity sensor 109 provided in the interchangeable lens 100 cannot be acquired by the camera body 131, and the shutter speed of the panning control cannot be calculated. However, the shutter speed may be calculated using the output signal of the angular velocity sensor 109.

Figure 5:
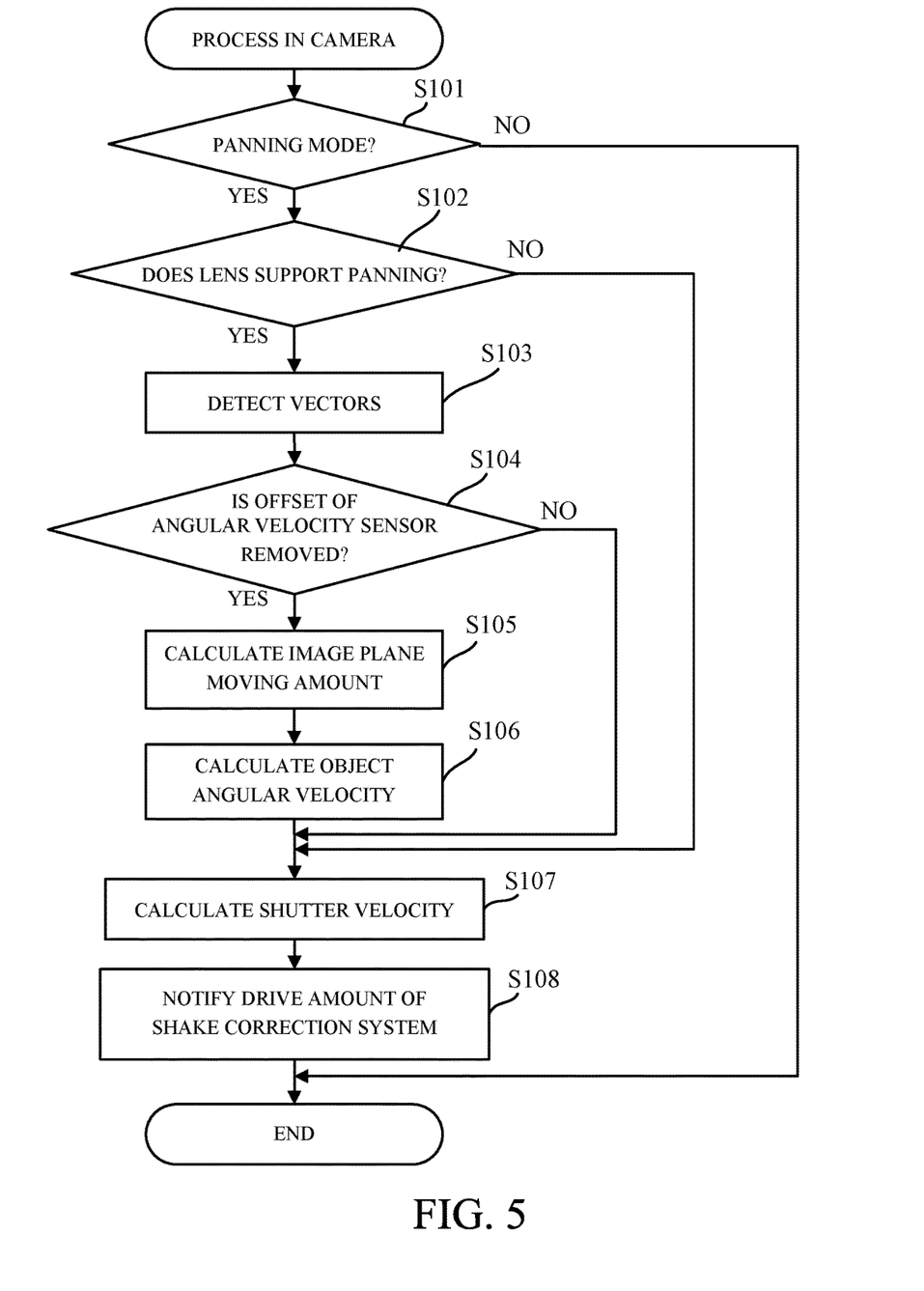
FIG. 5 is a flowchart illustrating processing of a camera body in this embodiment.
Figure 6:
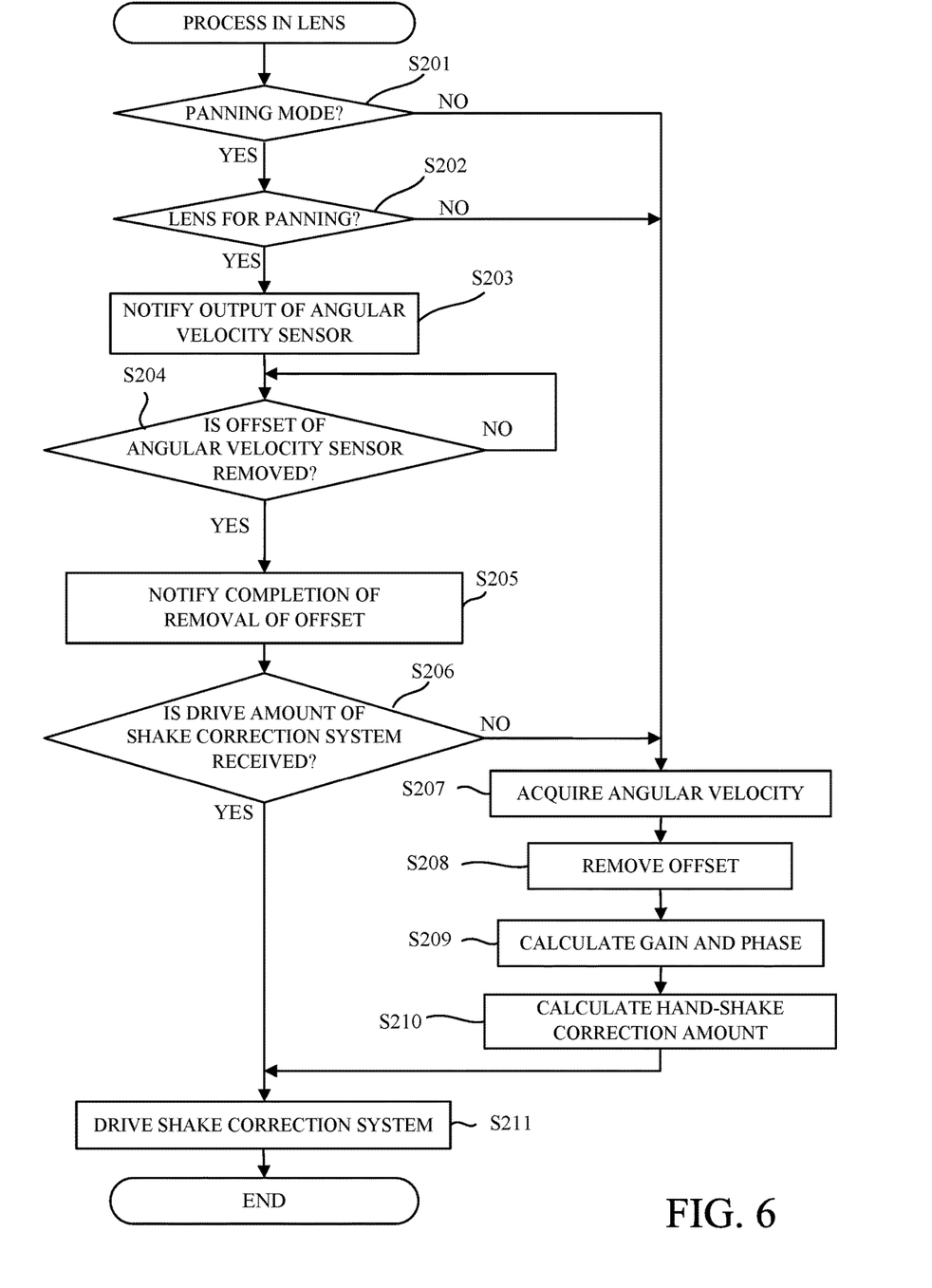
FIG. 6 is a flowchart illustrating processing of an interchangeable lens in this embodiment.

Next, referring to FIGS. 5 and 6, the processing of this embodiment will be described. FIG. 5 is a flowchart illustrating processing of the camera body 131, and it illustrates communication and control by the camera microcomputer 122. FIG. 6 is a flowchart illustrating processing of the interchangeable lens 100, and it illustrates communication and control by the lens microcomputer 110. Each step of FIGS. 5 and 6 is realized according to a predetermined program which the camera microcomputer 122 and the lens microcomputer 110 respectively read out from the memory to be executed.

Each step of FIG. 5 is executed by the camera microcomputer 122 while communicating with the lens microcomputer 110 via the mount contacts 123 and 113. First, at step S101, the camera microcomputer 122 determines whether the photographer has set the panning mode via the operation switch 130. When the panning mode is set, the camera microcomputer 122 notifies the setting of the panning mode to the lens microcomputer 110, and then the flow proceeds to step S102. On the other hand, when the panning mode is not set, the camera microcomputer 122 ends this flow without controlling the panning mode.

At step S102, the camera microcomputer 122 determines whether the interchangeable lens 100 attached to the camera body 131 is an interchangeable lens which supports the panning mode. When the interchangeable lens 100 supports the panning mode, the flow proceeds to step S103. On the other hand, when the interchangeable lens 100 does not support the panning mode, the flow proceeds to step S107. In this embodiment, the camera microcomputer 122 determines whether the interchangeable lens 100 supports the panning mode based on a reception signal (information indicating whether it supports the panning mode) from the lens microcomputer 110.

At step S103, the camera microcomputer 122 detects the motion vector as the motion amount of the object in the screen (i.e., image) by using the motion vector detector 118. Subsequently, at step S104, the camera microcomputer 122 determines whether the offset noise has been removed (or reduced) from the output signal (angular velocity data) of the angular velocity sensor 109 in the interchangeable lens 100 (whether the correction of the output signal is completed). This determination is performed by the camera microcomputer 122 receiving information (notification) indicating that the offset noise has been removed, that is, information relating to correction (information indicating that correction has been completed) from the lens microcomputer 110. When the offset noise is removed, the flow proceeds to step S105. On the other hand, when the offset noise is not removed, the flow proceeds to step S107.

At step S105, the camera microcomputer 122 calculates the moving amount (image plane moving amount) on the image plane based on data relating to the angular velocity of the angular velocity sensor 109, the focal length, and the frame rate. Subsequently, at step S106, the camera microcomputer 122 calculates the angular velocity (angular velocity information) of the object. The method of calculating the angular velocity of the object is as follows. First, the camera microcomputer 122 performs histogram calculation of all the motion vectors detected at step S103. When the motion vectors that is outside the certain range with reference to the image plane moving amount calculated at step S105 are equal to or more than a predetermined frequency (for example, four or more motion vectors), the camera microcomputer 122 determines the motion vectors as an object vector. Subsequently, the camera microcomputer 122 calculates an average value of the object vectors, and it calculates the average value of the object vector as the angular velocity of the object by using the data relating to the focal length and the frame rate.

Subsequently, at step S107, the camera microcomputer 122 calculates the shutter speed for the panning. The method of calculating the shutter speed is as follows. First, the camera microcomputer 122 acquires a set value of the background flowing amount set by the photographer via the operation switch 130. Subsequently, the camera microcomputer 122 acquires the data relating to the focal length sent from the lens microcomputer 110 via the mount contacts 113 and 123. Then, the camera microcomputer 122 acquires the angular velocity data of the angular velocity sensor 124 in the camera body 131 and the angular velocity data of the object calculated at step S106, and it calculates the shutter speed for the panning based on expression (1) above. When the angular velocity sensor 124 of the camera body 131 and the angular velocity sensor 109 of the interchangeable lens 100 are not provided, the background angular velocity is calculated from the histogram by using the background vectors, and the angular velocity of the background is calculated by using the background angular velocity, and the shutter speed for the panning may be calculated. Alternatively, a value programmed by the panning shutter speed calculator 127 (for example, 1/60 second) may be set in advance.

Finally, at step S108, based on the angular velocity of the object calculated at step S106 and the shutter speed for the panning control calculated at step S107, the camera microcomputer 122 determines a drive amount of the shift lens 104 during exposure period. Then, the camera microcomputer 122 notifies (sends) the drive amount of the shift lens 104 to the lens microcomputer 110. These are performed when it is determined that the offset noise is removed at step S104. On the other hand, when it is determined at step S104 that the offset noise is not removed, the camera microcomputer 122 does not determine the drive amount of the shift lens 104 and does not notifying (sending) the drive mount of the shift lens 104 to the lens microcomputer 110.

Each step of FIG. 6 is executed by the lens microcomputer 110 while communicating with the camera microcomputer 122 via the mount contacts 123 and 113. First, at step S201, the lens microcomputer 110 determines whether the panning mode is set. This determination is performed based on the notification from the camera microcomputer 122 at step S101 of FIG. 5. When the panning mode is set, the flow proceeds to step S202. On the other hand, when the panning mode is not set, the flow proceeds to step S207.

At step S202, the lens microcomputer 110 determines whether the interchangeable lens 100 is an interchangeable lens which supports the panning mode. When the interchangeable lens 100 supports the panning mode, the flow proceeds to step S203. On the other hand, when the interchangeable lens 100 does not support the panning mode, the flow proceeds to step S207.

At step S203, the lens microcomputer 110 notifies (sends) the angular velocity data of the angular velocity sensor 109 in the interchangeable lens 100 to the camera microcomputer 122. This notification is performed at a predetermined communication interval such as every frame. Subsequently, at step S204, the lens microcomputer 110 determines whether the offset noise has been removed (or reduced) from the output signal (angular velocity data) of the angular velocity sensor 109. When the offset noise is removed, the flow proceeds to step S205. On the other hand, when the offset noise is not removed, the flow proceeds to step S206.

At step S205, the lens microcomputer 110 notifies the camera microcomputer 122 that the offset noise has been removed from the output signal (angular velocity data) of the angular velocity sensor 109 (i.e., removal of the offset noise has been completed). Subsequently, at step S206, the lens microcomputer 110 determines whether the notification relating to the drive amount of the shift lens 104 is received from the camera microcomputer 122. When the lens microcomputer 110 receives the notification relating to the drive amount of the shift lens 104, the flow proceeds to step S211. On the other hand, when the lens microcomputer 110 does not receive the notification relating to the drive amount of the shift lens 104, the flow proceeds to step S207. For example, when the offset noise is not removed, it does not notify the camera microcomputer 122 that the offset noise has been removed from the output signal (angular velocity data) of the angular velocity sensor 109 (i.e., removal of the offset noise has been completed). The camera microcomputer 122 does not notify the lens microcomputer 110 about the drive amount of the shift lens 104 unless the lens microcomputer 110 notifies the camera computer 122 that the offset noise has been removed (completion of the removal of the offset noise). Accordingly, when the offset noise is not removed, the flow proceeds to step S207.

At step S207, the lens microcomputer 110 acquires the output signal (angular velocity data) of the angular velocity sensor 109. Subsequently, at step S208, the lens microcomputer 110 removes (or reduces) the offset noise from the output signal of the angular velocity sensor 109. More specifically, the lens microcomputer 110 cuts off a low frequency component included in the angular velocity data, for example, by using a high-pass filter having a function capable of changing characteristics with respect to an arbitrary frequency band, and then it outputs a signal in a high frequency band. As a result, the lens microcomputer 110 can remove or reduce the DC component superimposed on the output signal (angular velocity data) of the angular velocity sensor 109.

Subsequently, at step S209, the lens microcomputer 110 performs signal processing by using a filter circuit including an amplifier and a phase compensation filter that amplify the angular velocity data with the offset noise removed (reduced) with a predetermined gain (gain/phase calculation). Subsequently, at step S210, the lens microcomputer 110 integrates the angular velocity data signal-processed by the filter circuit at step S209 by the integrator 203 to calculate a target control value (hand-shake correction amount) for the hand-shake correction control.

Finally, at step S211, the lens microcomputer 110 drives the shift lens 104 based on the drive amount of the shift lens 104 received at step S206 or the hand-shake correction amount calculated at step S210.

As described above, in this embodiment, the camera microcomputer 122 changes the control in the panning photographing depending on whether the removal (reduction) of the offset noise included in the output signal of the angular velocity sensor is completed. That is, the camera microcomputer 122 does not calculate the angular velocity of the object until receiving the notification of the completion of the removal of the offset noise, and it does not notify the drive amount of the shift lens 104 based on the angular velocity of the object. On the other hand, the lens microcomputer 110 notifies the camera microcomputer 122 that the removal of the offset noise included in the output signal of the angular velocity sensor is completed, and it performs the hand-shake correction control until the camera microcomputer 122 receives the notification of the drive amount of the shift lens 104. Thus, according to this embodiment, it is possible to enhance the accuracy of the control in the panning photographing.

In this embodiment, the camera microcomputer 122 performs the control so as not to notify the drive amount of the shift lens 104. However, the present invention is not limited thereto, and a signal for performing the hand-shake correction control may be sent to the lens microcomputer 110. For example, the camera microcomputer 122 notifies the drive amount of the shift lens 104 as an arbitrary value (for example, "0"), and when receiving this value, the lens microcomputer 110 proceeds from step S206 to step S207 and it performs the hand-shake correction control.

Further, in this embodiment, the camera microcomputer 122 receives the notification that the removal of the offset noise included in the output signal of the angular velocity data is completed, but it is not limited thereto. For example, it is possible to set the angular velocity data sent from the lens microcomputer 110 to an arbitrary value (for example, "0"), and the camera microcomputer 122 can determine the completion of the offset noise by receiving this value.

As described above, in this embodiment, the control apparatus (i.e., control apparatus in the camera body) includes the motion vector detector 118 that detects the motion vector, the calculator (object angular velocity calculator 126), and the controller (camera microcomputer 122). The calculator calculates the angular velocity information of the object based on the motion vector and the angular velocity detected by the angular velocity detector (angular velocity sensor 109). The controller controls the shake corrector (lens microcomputer 110) based on the angular velocity information of the object. The controller changes the control of the shake corrector depending on the information relating to the correction of the output signal (i.e., information indicating that the correction is completed) from the angular velocity detector (S104 to S108).

Preferably, when the controller receives the information relating to the correction of the output signal, it controls the shake corrector by using the angular velocity information of the object (S104, S105, S106, S107, and S108). On the other hand, when the controller does not receive the information relating to the correction of the output signal, it controls the shake corrector without using the angular velocity information of the object (S104, S107, and S108). More preferably, when the controller does not receive the information relating to the correction of the output signal, it controls the shake corrector by using the angular velocity detected by the angular velocity detector (i.e., it performs hand-shake correction control or image stabilization control). More preferably, when the controller does not receive the information relating to the correction of the output signal, it sends the control signal for controlling the shake corrector by using the angular velocity detected by the angular velocity detector (i.e., control signal for performing the hand-shake correction control). More preferably, the control signal is information indicating that the angular velocity information of the object is zero.

Preferably, when the controller receives, as the information relating to the correction of the output signal, a flag indicating that the correction is completed, or receives a predetermined value (for example, zero) as the angular velocity corresponding to the output signal, it changes the control of the shake corrector. More preferably, the information relating to the correction of the output signal is information indicating that the variation (fluctuation) of the output signal is reduced (or removed). More preferably, the variation of the output signal is an offset noise (i.e., offset variation or offset temperature variation) of the output signal.

In this embodiment, the control apparatus (i.e., control apparatus in the interchangeable lens 100) includes the angular velocity detector (angular velocity sensor 109) that detects the angular velocity (i.e., vibration information), and the shake corrector (lens microcomputer 110). The shake corrector corrects the shake by using the angular velocity information of the object calculated based on the angular velocity and the motion vector detected by the motion vector detector. The shake corrector corrects the output signal from the angular velocity detector and sends the information relating to the correction of the output signal.

Preferably, the shake corrector corrects the output signal to reduce the variation of the output signal, and it sends, as the information relating to the correction of the output signal, the information indicating that the variation of the output signal is reduced. More preferably, when the shake corrector sends the information relating to the correction of the output signal, it corrects the shake by using the angular velocity information of the object. On the other hand, when the shake corrector does not send the information relating to the correction of the output signal, it corrects the shake without using the angular velocity information of the object.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-168721, filed on Aug. 31, 2016, which is hereby incorporated by reference herein in its entirety.

What is claimed is:

1. A control apparatus comprising:
a motion vector detector configured to detect a motion vector;
a calculator configured to calculate angular velocity information of an object based on the motion vector and an angular velocity detected by an angular velocity detector; and
a controller configured to control a shake corrector based on the angular velocity information of the object,
wherein the controller is configured to change control of the shake corrector depending on information relating to whether an output signal from the angular velocity detector has been corrected.

2. The control apparatus according to claim 1, wherein:
when the controller receives the information relating to the correction of the output signal, the controller controls the shake corrector by using the angular velocity information of the object, and
when the controller does not receive the information relating to the correction of the output signal, the controller controls the shake corrector without using the angular velocity information of the object.

3. The control apparatus according to claim 2, wherein when the controller does not receive the information relating to the correction of the output signal, the controller is configured to control the shake corrector by using the angular velocity detected by the angular velocity detector.

4. The control apparatus according to claim 3, wherein when the controller does not receive the information relating to the correction of the output signal, the controller is configured to send a control signal for controlling the shake corrector by using the angular velocity detected by the angular velocity detector.

5. The control apparatus according to claim 4, wherein the control signal is information indicating that the angular velocity information of the object is zero.

6. The control apparatus according to claim 1, wherein when the controller receives, as the information relating to the correction of the output signal, a flag indicating that the correction is completed, or receives a predetermined value as the angular velocity corresponding to the output signal, the controller is configured to change the control of the shake corrector.

7. The control apparatus according to claim 1, wherein the information relating to the correction of the output signal is information indicating that a variation of the output signal is reduced.

8. The control apparatus according to claim 7 wherein the variation of the output signal is an offset noise of the output signal.

9. A control apparatus comprising:
an angular velocity detector configured to detect an angular velocity; and
a shake corrector configured to correct a shake by using angular velocity information of an object calculated based on the angular velocity and a motion vector detected by a motion vector detector,
wherein the shake corrector is configured to correct an output signal from the angular velocity detector and send information relating to whether the output signal has been corrected.

10. The control apparatus according to claim 9, wherein the shake corrector is configured to:
correct the output signal to reduce variation of the output signal, and
send, as the information relating to the correction of the output signal, information indicating that the variation of the output signal is reduced.

11. The control apparatus according to claim 10, wherein:
when the shake corrector sends the information relating to the correction of the output signal, the shake corrector is configured to correct the shake by using the angular velocity information of the object, and
when the shake corrector does not send the information relating to the correction of the output signal, the shake corrector is configured to correct the shake without using the angular velocity information of the object.

12. An image capturing apparatus where a lens apparatus is attachable, comprising:
an image sensor configured to photoelectrically convert an optical image formed via the lens apparatus;
a motion vector detector configured to detect a motion vector based on an image signal output from the image sensor;
a calculator configured to calculate angular velocity information of an object based on the motion vector and an angular velocity detected by an angular velocity detector; and
a controller configured to control a shake corrector based on the angular velocity information of the object,
wherein the controller is configured to change control of the shake corrector depending on information relating to whether an output signal from the angular velocity detector has been corrected.

13. A lens apparatus attachable to an image capturing apparatus, comprising:

an image capturing optical system including a correction lens;

an angular velocity detector configured to detect an angular velocity of the lens apparatus; and a shake corrector configured to correct a shake by using angular velocity information of an object calculated based on the angular velocity and a motion vector detected by a motion vector detector, wherein the shake corrector is configured to send an output signal from the angular velocity detector and send information relating to whether the output signal has been corrected.

14. A control method comprising:

detecting a motion vector;

calculating angular velocity information of an object based on the motion vector and an angular velocity detected by an angular velocity detector; and controlling a shake corrector based on the angular velocity information of the object, wherein controlling the shake corrector includes changing control of the shake corrector depending on information relating to whether an output signal from the angular velocity detector has been corrected.

15. A control method comprising:

detecting an angular velocity based on an output signal from an angular velocity detector; and correcting a shake by using angular velocity information of an object calculated based on the angular velocity and a motion vector detected by a motion vector detector, wherein correcting the shake includes correcting the output signal from the angular velocity detector and sending information relating to whether the output signal has been corrected.

16. A non-transitory computer-readable storage medium storing a program which causes a computer to execute a process comprising:

detecting a motion vector;

calculating angular velocity information of an object based on the motion vector and an angular velocity detected by an angular velocity detector; and controlling a shake corrector based on the angular velocity information of the object, wherein controlling the shake corrector includes changing control of the shake corrector depending on information relating to whether an output signal from the angular velocity detector has been corrected.

17. A non-transitory computer-readable storage medium storing a program which causes a computer to execute a process comprising:

detecting an angular velocity based on an output signal from an angular velocity detector; and correcting a shake by using angular velocity information of an object calculated based on the angular velocity and a motion vector detected by a motion vector detector, wherein correcting the shake includes correcting the output signal from the angular velocity detector and sending information relating to whether the output signal has been corrected.

* * * * *